Figure 1:
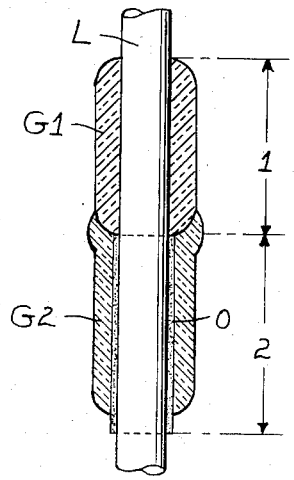

Aug. 27, 1957  G. J. EKKERS  2,803,926
METHOD OF SEALING ELECTRODE LEAD-IN CONDUCTORS TO THE
WALL OF ELECTRIC DISCHARGE TUBE AND
ELECTRODE COLLAR PRODUCED THEREBY
Filed May 16, 1955

INVENTOR
Tysbert Jacob Ekkers
BY Pierce, Scheffler & Parker
ATTORNEYS

# United States Patent Office 2,803,926
Patented Aug. 27, 1957

2,803,926

METHOD OF SEALING ELECTRODE LEAD-IN CONDUCTORS TO THE WALL OF ELECTRIC DISCHARGE TUBE AND ELECTRODE COLLAR PRODUCED THEREBY

Gysbert Jacob Ekkers, Wettingen, Switzerland, assignor to "Patelhold" Patentverwertungs- & Elektro-Holding, A.-G., Glarus, Switzerland Application May 16, 1955, Serial No. 508,756

Claims priority, application Switzerland May 15, 1954

2 Claims. (Cl. 49—81)

The present invention relates to electric discharge tubes made of glass and more particularly to an improved method for sealing the metallic lead-in conductors at the places where the conductors pass through the wall of the tube. The tubes may be evacuated or may be filled with a gas or vapor such as a vapor of an alkali metal.

In making such metal-to-glass seals it is known to utilize for the lead-in conductor a metal which possesses substantially the same thermal expansion coefficient as the glass and moreover to oxidize the surface of the lead-in conductor throughout its area of contact with the glass wall. During fusion of the oxidized area of the lead-in conductor into the glass, a part of the oxide becomes dissolved in the glass. A metal-to-glass seal made in such manner possesses excellent mechanical strength but suffers from two disadvantages. One is that the high temperature prevailing inside of the tube while operating to which the oxide layer is exposed at the inner end portion tends to cause the layer to progressively disintegrate. Another factor tending to effect disintegration of the oxide layer results from its exposure to the reducing action of the vapor e. g. alkali metal vapor which is commonly used to fill the interior of tubes of this type. The end result is a gradual destruction of the metal-to-glass seal from the inside to the outside of the tube which, when it does finally allow air to leak by the seal into the tube interior, renders the tube unfit for further use.

It is also known to form the metal-to-glass seal for the lead-in conductor by cleaning i. e. clearing the conductor surface of all impurities and then forming the glass about the same in a non-oxidizing atmosphere. A seal made according to such method will not leak but does suffer from the disadvantage of being mechanically weak as a result of the unavoidably weak adhesion between the metal and glass.

The object of the present invention is to provide an improved method of manufacture resulting in an improved metal-to-glass seal which incorporates an oxide layer on the lead-in conductor at the sealing area in order to obtain high mechanical strength but which has none of the disadvantages attendant the prior art methods of making the seal. In general the improved result results from the fact that when the seal is completed, the portion of the lead-in conductor to which the oxide layer is applied is effectively isolated from the interior of the tube. Consequently, the oxide layer is neither exposed to high temperature nor to reducing action of any alkali metal vapor filling in the tube. The essential isolation of the oxide layer from the tube interior is brought about by making the metal-to-glass seal in two longitudinal portions. The inner portion of the seal, i. e. the portion nearest the tube interior is established between the surface of the lead-in conductor itself and glass, without use of an intermediate oxide layer on the metal. The outer portion of the seal, i. e. the portion nearest the tube exterior is established using an oxide layer on the metal.

Figure 2:
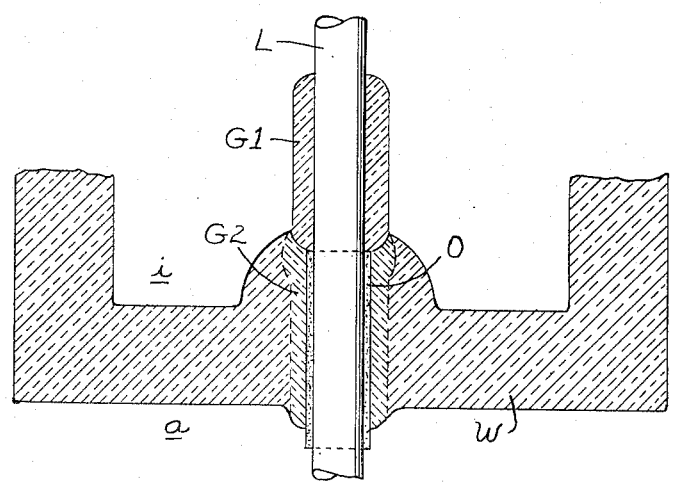

In the drawings which illustrate the method of manufacturing the improved metal-to-glass seal, Fig. 1, is a view of the portion of the lead-in conductor adapted to be sealed into the wall of the tube as it exists at an intermediate stage in the method, and Fig. 2 shows the completed seal in the wall of the tube.

With reference now to the drawings and to Fig. 1 in particular, the upper portion of the lead-in conductor L for the distance represented by 1 is first cleaned to remove all impurities and absorbed gas and is then covered with a layer G1 of glass in a non-oxidizing atmosphere. The glass layer G1 may have a thickness as little as a few hundredths of a millimeter. The lower part of the conductor L indicated by numeral 2 is then oxidized to form an oxide layer O and this portion of the conductor is then covered with a layer G2 of glass. During application of the glass layer G2 the portion thereof adjacent the lower end of the upper glass layer G1 fuses with the latter and hence seals the junction area between the layers G1 and G2.

The lead-in conductor L with the glass layers G1 and G2 thereon, as shown in Fig. 1, is then fused into the tube wall W in the position shown in Fig. 2 wherein it will be noted that the upper "brightened" portion of the lead-in conductor is disposed adjacent the inside i of the tube and so is exposed to the high temperature inside the tube as well as to the alkali metal vapor should the tube be of the gas filled type.

The lower portion of the lead-in conductor, i. e. that portion which is covered with the oxide layer is disposed adjacent the outside a of the tube. Hence the oxide layer is isolated from the tube interior and cannot possibly be contacted by any vapor within the tube.

It will thus be seen that the invention makes it possible to obtain the benefit of high mechanical strength which obtains when an oxide layer is used as an intermediate bond between the conductor surface and the glass surface and yet protect the same against the destructive effects of high temperature and exposure of the oxide layer to the reducing agent, e. g. alkali metal oxide, within the tube.

As is clear from Fig. 2 the oxide layer O essential to high strength being disposed adjacent the outside of the tube wall is effectively removed from the destructive effects of high temperature which exists inside of the tube while the latter is operating, and the layer O also cannot come into contact with the reducing agent inside the tube due to the presence of the seal at the inner portion of the tube wall between the non-oxidized portion 1 of conductor L and the glass, this portion of the seal inherently providing a tight seal even in the presence of high temperatures and remaining practically unaffected by any reducing agent inside the tube.

I claim:

1. In the method of making a metal-to-glass seal for sealing lead-in conductors to the wall of a glass tube where such conductors pass through the wall, the steps comprising, cleaning a first longitudinal portion of the lead-in conductor, applying a first layer of glass to said first portion in a non-oxiding atmosphere, oxidizing a second longitudinal portion of said lead-in conductor adjacent said first portion, applying a second layer of glass to said second portion, and fusing said first and second glass layers into the wall of said glass tube such that the second layer enclosing and sealing the oxidized surface portion of said lead-in conductor is disposed closest to the outside surface of said tube wall and is isolated from the interior of said tube.

2. A metal-to-glass seal sealing a lead-in conductor in the wall of a glass electric discharge tube, said seal including a first longitudinal portion of said conductor adjacent the interior of said tube sealed directly to a glass layer and a second longitudinal portion of said conductor adjacent the exterior of said tube sealed indirectly to said glass layer through an intermediate layer of oxide thereon, said oxide layer being isolated from the interior of said tube and said glass layer being sealed to the wall of said tube.

References Cited in the file of this patent

UNITED STATES PATENTS 2,617,068    Spinnler et al. _____ Nov. 4, 1952